Patented Jan. 21, 1936

2,028,575

UNITED STATES PATENT OFFICE 2,028,575

COLLOIDAL COPPER SOLUTION

John Torigian, Queens Village, N. Y., assignor to The Drug Products Co. Inc., Long Island City, N. Y., a corporation of New York No Drawing. Application June 11, 1934, Serial No. 730,155

5 Claims. (Cl. 167—72)

The present invention relates to improvements in the process of manufacturing and in the end product of a colloidal copper solution adapted for use in the treatment of anemias or similar conditions by injection or in topical or oral administration. More specifically, the invention is concerned with the production of a solution containing colloidal copper as a main active ingredient, the other accompanying ingredients to be hereinafter more specifically described, serving the purposes hereinafter to be described.

The disclosure of the process of manufacturing the subject matter of the present invention will incidentally disclose the nature and properties of the product.

Besides other inorganic elements, liver contains copper which acts as a catalytic agent with iron in building up or enriching the blood hemoglobin. In anemic conditions, where there is a deficiency of this naturally occurring copper, either copper alone may be administered to increase the assimilation and utilization of iron taken with food, or the copper may be combined with iron, manganese, arsenic, or other known elements for the treatment of anemias. It has been found that copper in the colloidal form is admirably suited for the aforesaid purposes, since, due to its colloidality, it is better tolerated, slowly assimilated and eliminated and the toxicity greatly reduced.

It has been further found that among the organic acids, gluconic acid is well suited to make a colloidal copper solution, and for purposes of setting forth a typical composition embodying the present invention, the said acid will be used in this disclosure, although it is to be distinctly understood that in place of gluconic acid, other organic hydroxy-acids might be used, such as malic acid, citric acid, tartaric acid, lactic acid, laevulinic acid, etc. The proportion of ingredients employed are toward the formation of 1,000 c. c. of the finished product, containing 1% of metallic copper it being understood that if another organic acid is employed the relative proportions of ingredients would vary accordingly.

In practicing the invention, 26.7 gm. of cupric chloride is dissolved in 200 c. c. of double distilled water freshly prepared and deaerated. A solution of sodium hydroxide is then prepared by dissolving 18.8 gm. of said base in about 200 c. c. of double distilled water freshly prepared and deaerated. A solution of gluconic acid is next prepared by dissolving 79.6 gm. of said acid in 200 c. c. of double distilled water freshly prepared and deaerated.

The sodium hydroxide solution is now added to the cupric chloride solution and the mixture warmed to about 80–85° C. The gluconic acid solution is then likewise warmed to 80–85° C. and then added slowly with stirring to the previous mixture. The pH is then adjusted to a value slightly under 7.0, preferably from 6.2 to 6.8. After adjusting the pH, about 2% of benzyl alcohol may be added. This acts as a local anesthetic for intramuscular injection administration. An amount of water sufficient to make up 1,000 c. c. of solution is then added. The reaction taking place in the above process is probably as follows:

$CuCl_2 + 2H_2O + 3NaOH + HC_6O_7H_{11} \rightarrow$
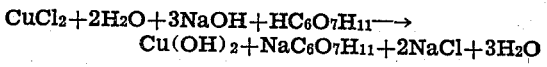
$Cu(OH)_2 + NaC_6O_7H_{11} + 2NaCl + 3H_2O$ As the final steps in the preparation of the colloidal copper solution, the mixture is permitted to stand for not less than 48 hours to precipitate impurities in the event the latter are present, whereupon the solution is filtered into clean and dry glass containers. The filtrate is then drawn into dry and sterile ampuls, sealed and sterilized. It is not necessary to add dextrose, sucrose or other sugar protective colloid to make the solution colloidal or to prevent precipitation since copper hydroxide in sodium gluconate is self-protecting.

It is to be understood that, in the above example, other alkalis, such as potassium hydroxide may be used in place of sodium hydroxide and that the other organic hydroxy-acids outlined hereinbefore may be substituted for the gluconic acid.

The final colloidal copper solution when examined under the ultra microscope shows a fine dispersion of colloidal particles exhibiting a distinct Brownian movement and upon analysis the solution shows 1% of copper. The average human dose is from 10 to 15 milligrams.

It is to be understood that the proportions of ingredients hereinbefore mentioned are given merely by way of example and that the invention is not limited to such proportions, as these may be varied so long as the required result is obtained. Likewise, in the manner of preparation, slight variations in the successions of steps may be resorted to without departing from the spirit of the invention nor enlarging the scope of the appended claims.

I claim:

1. A product for the treatment of anemias comprising the suspension of colloidal copper hydroxide in the medium of an aqueous salt of an organic hydroxy-acid.

2. A product for the treatment of anemias comprising the suspension of colloidal copper hydroxide in the medium of aqueous sodium gluconate.

3. A process for preparing a colloidal therapeutic agent comprising reacting a copper salt with an alkaline base, adding to the reaction mass an organic hydroxy-acid and adjusting the pH so that the solution is slightly on the acid side.

4. The process of claim 3 in which the organic hydroxy-acid is gluconic acid.

5. A process for preparing a colloidal therapeutic agent comprising reacting cupric chloride with sodium hydroxide, adding to the reaction mass gluconic acid and adjusting the pH so that the solution is slightly on the acid side.

JOHN TORIGIAN.